United States Patent
Maugendre et al.

(10) Patent No.: US 7,428,827 B2
(45) Date of Patent: Sep. 30, 2008

(54) DEVICE AND METHOD FOR MELTING VITRIFIABLE MATERIALS

(75) Inventors: Stephane Maugendre, Precy sur Oise (FR); Francois Szalata, Laigneville (FR); Remi Jacques, Estrees Saint Denis (FR); Biagio Palmieri, Compiegne (FR)

(73) Assignee: Saint-Gobain Isover, Courbevoie (FR)

( * ) Notice: Subject to any disclaimer, the term of this patent is extended or adjusted under 35 U.S.C. 154(b) by 465 days.

(21) Appl. No.: 10/495,752

(22) PCT Filed: Nov. 27, 2002

(86) PCT No.: PCT/FR02/04060

§ 371 (c)(1),
(2), (4) Date: Oct. 8, 2004

(87) PCT Pub. No.: WO03/045859

PCT Pub. Date: Jun. 5, 2003

(65) Prior Publication Data

US 2005/0039491 A1    Feb. 24, 2005

(30) Foreign Application Priority Data

Nov. 27, 2001    (FR) ................... 01 15354

(51) Int. Cl.
    *C03B 5/237*    (2006.01)
(52) U.S. Cl. .................... 65/121; 65/126
(58) Field of Classification Search ............ 65/121, 65/126
    See application file for complete search history.

(56) References Cited

U.S. PATENT DOCUMENTS

| | | | | |
|---|---|---|---|---|
| 2,751,714 A | * | 6/1956 | Knaff ................ | 65/99.1 |
| 2,955,384 A | * | 10/1960 | Silverman ............ | 65/146 |
| 3,445,216 A | * | 5/1969 | Keefer et al. ......... | 65/145 |
| 3,733,189 A | * | 5/1973 | Zurheide et al. ...... | 65/540 |
| 4,083,711 A | * | 4/1978 | Jensen ............... | 65/346 |
| 4,208,201 A | * | 6/1980 | Rueck ................ | 65/27 |
| 4,277,274 A | * | 7/1981 | Chrisman ............. | 65/29.17 |
| 4,718,931 A | * | 1/1988 | Boettner ............. | 65/29.13 |
| 4,875,917 A | * | 10/1989 | Lentz ................ | 65/403 |
| 4,877,449 A | | 10/1989 | Khinkis | |
| 5,052,312 A | * | 10/1991 | Rackley et al. ....... | 110/346 |
| 5,588,978 A | * | 12/1996 | Argent et al. ........ | 65/29.1 |

(Continued)

FOREIGN PATENT DOCUMENTS

JP    56120523    9/1981

(Continued)

OTHER PUBLICATIONS

U.S. Appl. No. 10/495,752, filed May 27, 2004, Maugendre, et al.

(Continued)

*Primary Examiner*—Carlos Lopez
(74) *Attorney, Agent, or Firm*—Oblon, Spivak, McClelland, Maier & Neustadt, P.C.

(57) ABSTRACT

The subject of the invention is a device for melting batch materials that combines at least two separate melting modules, including a module A(1) which is predominantly fitted with heating means in the form of crown burners and/or submerged electrodes, and a module B(2) which is predominantly fitted with heating means in the form of submerged burners.

27 Claims, 3 Drawing Sheets

U.S. PATENT DOCUMENTS

Figure 1:
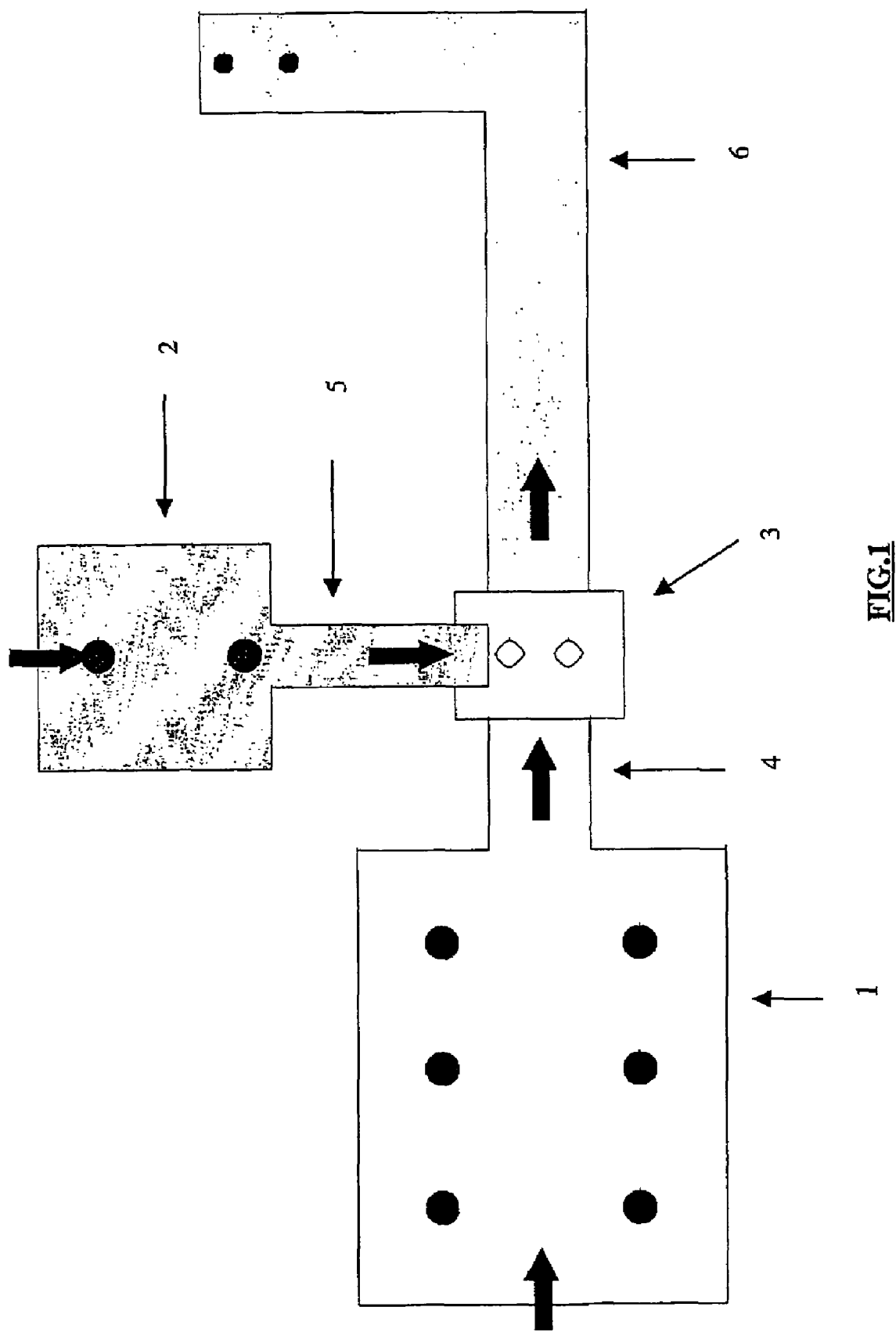

| | | |
|---|---|---|
| 6,460,376 B1 | 10/2002 | Jeanvoine et al. |
| 2002/0162358 A1 | 11/2002 | Jeanvoine et al. |
| 2004/0168474 A1* | 9/2004 | Jeanvoine et al. ............ 65/121 |
| 2004/0224833 A1* | 11/2004 | Jeanvoine et al. ............ 501/70 |
| 2005/0039491 A1 | 2/2005 | Maugendre et al. |
| 2006/0000239 A1 | 1/2006 | Jeanvoine et al. |
| 2007/0119213 A1* | 5/2007 | Simpson et al. ............... 65/157 |

FOREIGN PATENT DOCUMENTS

| | | | |
|---|---|---|---|
| SU | 610800 | * | 5/1978 |
| WO | 99/28247 | | 6/1999 |
| WO | 99/37591 | | 7/1999 |
| WO | WO99/37591 | | 7/1999 |

OTHER PUBLICATIONS

U.S. Appl. No. 10/445,063, filed May 27, 2003, Jeanvoine, et al.

U.S. Appl. No. 10/829,955, filed Apr. 23, 2004, Jeanvoine, et al.

* cited by examiner

DEVICE AND METHOD FOR MELTING VITRIFIABLE MATERIALS

The invention relates to a device and to a process for melting batch materials, for the purpose of continuously feeding glass-forming plants with molten glass (in the invention the term "glass" denotes an essentially vitreous matrix, especially made of mineral compositions denoted by the term "glass" or "rock" in the field of insulation mineral wool).

More particularly intended are plants for forming glass fibers of the mineral wool type for thermal or acoustic insulation. However, the invention also relates to plants for forming textile glass yarns, referred to as reinforcing yarns, and for forming glass hollow-ware of the bottle or flask type, or even flat glass plants such as float or laminating plants. More particularly in the latter case, the actual melting is generally supplemented with a refining step.

In general, melting furnaces are conventionally divided into two broad categories according to the heating means adopted to melt the batch materials.

On the one hand, there are electric melting furnaces called "cold crown" furnaces in which the melting is carried out by electrodes that are immersed in the depth of the molten glass. This is the case known, for example, from patent EP-B-0 304 371.

On the other hand, there are fuel-fired furnaces, such as recuperative furnaces with metal recuperators or regenerative furnaces with regenerators, especially those known from patent U.S. Pat. No. 4,599,100. In the case of regenerative furnaces, the heating power is supplied by two rows of burners generally operating with a fuel/air mixture, and in alternating mode: the combustion gases then heat, alternately, one or the other melting compartment and are in communication with the latter. The combustion gases are thermally drained through the stacks of refractories that make these regenerators, the said refractories then releasing the heat thus stored into the melting compartment. In the case of furnaces with metal recuperators, the two rows of burners operate continuously and the flue gases are recovered in order to drain them of their heat by preheating the combustion air for the burners.

The technology of these two conventional types of furnace has been completely mastered and overall provides satisfaction in the glass industry. However, their mode of operation lacks a certain flexibility. Thus, to start or stop the operation of such furnaces is a complex and tricky operation. To modify the parameters during operation, for example the amount or the nature of the batch materials feeding the furnace, is also a relatively tricky procedure. The quite long residence time of the batch materials during melting in the furnace also gives the latter a certain amount of inertia.

There is also a third approach, which is that of melting using submerged burners. An example of this type of furnace is described in patent WO 99/37591. It consists in using, as heating means, burners fed appropriately with fuel/oxidizer, these generally being placed so as to be flush with the floor in such a way that the flame develops within the actual batch materials undergoing melting. This technology has many advantages. It allows good energy efficiency. It makes it possible to produce a substantial output with a much smaller furnace than a conventional furnace. This is because the submerged burners generate, within the mass of batch materials, strong convective stirring movements, resulting in rapid melting and a shorter residence time of the batch materials in the furnace. Finally, this type of furnace may be fed, at least partly, with batch materials which are not raw materials quarried or synthesized expressly for this purpose, but recycling products, such as cullet, plastic/glass composites, or even sources of hydrocarbons such as coal or organic polymers, which can be used as fuel for the submerged burners.

However, this mode of melting has specific features. There is a tendency to obtain a particular molten glass having a much lower density than that obtained with conventional furnaces. What is involved is more of a foam than a liquid phase, it generally being substantially more viscous. Its treatment and transfer toward the forming members may therefore be difficult, the more so when the amounts of foam produced are considerable.

The object of the invention is therefore a novel mode of melting batch materials, which can in particular allow more flexible operation than that of conventional furnaces. Secondarily, it seeks ways of making this novel mode of melting able to be incorporated into existing plants without having recourse to said conventional furnaces.

The subject of the invention is firstly a device for melting batch materials that combines at least two separate melting modules, including:
- a module called module A, which is predominantly fitted with heating means in the form of crown burners and/or submerged electrodes;
- a module called module B, which is predominantly fitted with heating means in the form of submerged burners.

Within the context of the present invention, the "combination" of the two modules means that they both contribute to producing molten batch materials in various possible ways, as will be explained in detail later.

The module A according to the invention is therefore a conventional melting compartment with electric melting (submerged electrodes) and/or fuel-fired melting (crown burners). The invention therefore makes it possible to preserve, in existing industrial plants, this type of melting compartment and to derive all the benefits thereof, most particularly those of the accumulated experience gained on this subject in the glass industry. Use is preferably made of an electric melting furnace when it is desired to reduce appreciably the fly of certain compounds such as alkaline borates.

The module B according to the invention employs melting by submerged burners. This concise term covers any mode of combustion of fuels, especially fossil fuels, with at least one fuel gas, the said fuels/gas or the gaseous products resulting from the combustion being injected below the level of the mass of batch materials. The burners may pass through the side walls or the floor of the module B. It is also possible to suspend them from the top, by fastening them to the crown or to any suitable superstructure. It is possible to choose to inject only the combustion gases via these burners, combustion taking place outside the actual melting module. It is also possible to inject only oxidizer (air, oxygen or oxygen-enriched air) or oxidizer with an insufficient amount of gaseous fuel of the $H_2$ or natural gas type, and then to introduce fuels in liquid or solid form with the batch materials. This will be explained in detail below. For the constructional details of this module, reference may be made to the aforementioned patent WO 99/37591.

It turns out that there is in fact an extremely advantageous synergy from the industrial standpoint in combining these two types of melting module. Firstly, the conventional melting module A may be, specifically, the melting module of existing forming plants. The invention may thus be used in these plants, modifying them but without having to entirely reconstruct the furnace. This is of paramount importance from the economic standpoint insofar as the vast majority of existing plants in the glass industry are furnaces of this type.

Secondly, the melting module B with submerged burners will be able to give the module A the flexibility that it lacks, at various levels and without thereby upsetting the rest of the plant. What actually happens is that the invention allows the use of an existing furnace (module A) in the context of a different type of production from that for which it was designed at the outset, by virtue of the addition of the module B. The module A/module B assembly in fact forming a variable-capacity furnace.

First of all there is a gain in flexibility as regards the output of the melting device according to the invention in its entirety.

This is because each conventional melting module has "its" output range, and once its maximum output has been reached, the module is blocked. The output of a submerged-burner melting module itself may be more easily and more rapidly modulated with variations of relatively large magnitude. It is thus possible to choose an operating regime roughly constant in terms of output for the module A, particularly in the context of the flat glass (float line) industry, and to use the melting module B to modify the overall output. This melting module B thus gives an additional range of outputs over and above the output of the module A. Further, since a submerged-burner melting module can be shut down and restarted quickly and relatively easily, it is thus possible to have an overall output TG that is the sum of the output TA of the melting module A and of the output TB of the submerged-burner melting module B, with it being possible for TB to vary rapidly between 0 (the module being functionally shut down) and a determined maximum value TB max (determined in particular according to the size of the melting module B, the amount of material loaded into the furnace, etc.).

There is also a gain in terms of the type of glass manufactured. The submerged-burner melting module B is capable of melting batch materials of changing and/or less "noble" composition than those used to feed conventional melting modules. It is therefore possible to feed the module B with batch materials the chemical nature of which complements the batch materials fed to module A.

There are at least two advantages to that:

it is thus possible globally to modify the glass supplied to the forming members, for example to alter its viscosimetric characteristics, the redox (insulation glass wool) or spectrophotometric characteristics (in the case of flat glass), etc., by using module B to "adjust" the composition coming from module A, or vice versa.

it is possible to use module B to recycle materials that would carry the risk of deteriorating the operation of conventional melting modules of type A, for example contaminated cullet, metal/glass composites, polymer/glass composites or polymers used as fuel as mentioned above. Depending on the arrival of material to be recycled, it is possible to adapt the composition of the material fed to furnace B, to vary considerably the proportion from recycling or reprocessing of waste/cullet with respect to the proportion of more traditional raw materials, particularly those from quarries.

As far as the relative sizes of modules A and B are concerned, there are three possible scenarios each of which has its advantages depending on what is being sought. Indeed, the invention can be applied to conventional melting modules of existing production lines, and, in this case, the size of module A according to the invention is dictated from the start. This choice may also depend on the type or amount of material to be loaded into the module B, particularly the amount of cullet to be melted.

According to a first alternative, modules A and B may be of similar or even identical sizes (taking the estimated size to be the surface of the floor and/or the volume defined by the module able to filled with glass being melted).

In a second alternative, module B may be larger in size than module A, for example at least 1.5 times, twice or three times as large (for example in a size ratio ranging from 1.1/1 to 30/1 or 20/1). This in particular will be the configuration adopted when it is anticipated that module B will be used to melt a (very) large amount of cutlet or other material suited to this type of melting.

In a third alternative, it is also possible to choose the relative dimensions of the melting modules A and B such that the module B is, in terms of volume and/or in terms of floor surface, at least one and a half, two or three times smaller than the module A (for example in a ratio 1/1.1 to 1/30 or 1/20). Indeed, a submerged-burner melting module may have a far greater output, for a comparable size, than a conventional melting module. This is, incidentally, one of its greatest advantages. To therefore give a melting module of type A a greater range of outputs, all that is required is for it to be combined with a submerged-burner module far smaller than itself. This is particularly beneficial when the submerged-burner melting module B is "grafted" onto an existing plant using a module A which may be of large size.

According to a preferred embodiment of the invention, means may be provided for recuperating the flue gases originating from the combustion in the module B, means directing them (possibly after treatment) toward the melting module A where they can be thermally drained. In order to make best use of the synergy of the modules A and B, it is thus possible to reduce the power consumption of the module A by using the flue gases of the module B. The reverse is equally possible.

According to a first alternative, the melting module A and the melting module B both open directly or via ducts/compartments, into a mixing module called module C. The invention therefore anticipates, in this alternative, mixing the two streams of molten batch materials from the modules A and B in a module specially dedicated to that. This module needs to be equipped/designed appropriately in order to obtain, at output, a single stream that is as homogeneous as possible, in the knowledge that the streams for mixing have different characteristics and characteristics that can vary during the operation of the melting device in its entirety. On the one hand, there is a stream from module A which is liquid, of a given composition, that can be kept essentially constant or that can, on the other hand, vary considerably. On the other hand, there is a stream from module B which has rather the appearance of a foam, with a considerably lower density, higher viscosity, which may have a fairly different temperature, and the chemical composition of which may differ considerably from the previous one. This is why it is recommended that this mixing module C be fitted with various stirring, homogenizing and/or heating means. These may be bubblers and/or mechanical stirrers and/or submerged burners (the latter are advantageous because of the heat they provide and, above all, because of the agitation they cause) and/or submerged electrodes, etc. It is thus possible to anticipate obtaining, at the outlet of this module, a mixture that is as homogeneous as possible, particularly in terms of temperature and viscosity.

Advantageously, this mixing module opens directly, or via at least one compartment, into a duct feeding the fiber-forming members (particularly with a view to producing mineral wool) or into a refining compartment (if the issue is that of making flat glass).

It is possible to anticipate various configurations for ensuring the flow of the batch materials in the process of being melted in the molten state from modules A and B toward module C. It is possible to provide a duct between module A and module C and/or a duct between module B and C. It is also possible to elect to connect module A to module C and/or module B to module C directly; it is therefore possible to have no, one or two transfer ducts from A and B to C.

Whether or not there is a transfer duct, flow from modules A and B to module C can be ensured using at least one of the following systems: gravity overspill, particularly by raising one of the modules at least with respect to module C, flow through a possibly submerged throat. These are known means for plants in the glass-making industry. Weir systems have the advantage of making the two streams easy to mix. It is possible, in order to obtain these, to raise one of the modules as stated above. However, it is also possible to avoid this raising, which may prove complicated to achieve, and replace it by a throat system associated with a resurgence. This scenario will be detailed later.

Thus, when there is a transfer duct between one of the modules A, B at least and module C, this duct is advantageously equipped, at the inlet and at the outlet, with a throat and/or weir system. The terms "inlet" and "outlet" are to be considered on the basis of the direction in which the molten materials flow from A, B toward C, from upstream to downstream in the production line.

When there is no transfer duct between at least one of the modules A, B and module C, then a throat and/or weir system is advantageously provided at the junction between module A and module C and/or between module B and module C.

When there actually are one or two transfer ducts, it is advantageous for it (them) to be equipped with thermal conditioning means. These may be heating means of the crown burner, or submerged electrode type, that may be combined with cooling means such as air intakes or water box systems. This thermal conditioning may serve to facilitate/prepare for the homogenization work which is performed in the mixing module C, in order already to bring the temperatures and viscosities of the streams of molten materials from modules A and B closer.

An advantageous embodiment consists in the module A communicating (without being raised) with module C via a throat with resurgency, because this is often the configuration encountered in existing conventional plants. A module B may be combined therewith, which module B may be raised with respect to module C, for example with a weir controlled by a throat and an appropriate lip.

According to a second alternative form of the invention, it is possible, in the scenario where module A operates essentially with crown burners, to anticipate for the module B to open directly, or via one or more ducts, into the melting module A, particularly into its downstream part. In this alternative form, there is no longer any true mixing module, and the foam from module B overspills into the molten glass from module A. It is therefore beneficial to provide the downstream part of module A, where this overspill occurs, with stirring or homogenizing means, means of the bubbler type or even with submerged burners located in this region, to encourage the two glasses to mix (this region preferably lies in the third of module A which lies furthest downstream).

There are other possible ways of mixing the two glasses.

According to a third alternative form, it is also possible to dispense with a special-purpose mixing module C, for example by introducing the foamy glass from module B into the duct into which module A opens and which can feed the fiber-forming members. In this case, it is beneficial for the foamy glass to be introduced, particularly also by overspill, into the upstream part of this duct, so that it has the time, as it runs along a significant length of this duct, to become refined as best as possible through the coalescence of the bubbles it contains, which bubbles are generally of considerable size. It is then advantageous for the region of the duct in which the streams of molten materials meet to be specifically equipped. It may be equipped with the homogenizing and/or stirring means mentioned above in the subject of the transfer ducts and module C, namely submerged burners, bubblers. It may also be contrived for there to be, in this particular region, a depth of glass suitable for convectional movements to be able to become established. This then in some way recreates a kind of mixing region of the module C type, but this time within a duct.

According to a fourth alternative form, the module B and the mixing module C of the first alternative form are combined: the conventional melting module A is connected (directly or via at least one duct) to a mixing/melting module B' which is equipped with heating means essentially in the form of at least one submerged burner, and which is fed directly with batch materials/cullet. The module B' then opens, directly or otherwise, onto a duct feeding fiber-forming machines or onto a refining compartment. This configuration is particularly advantageous when the module B is fed with material that does not carry the risk of generating unmolten inclusions as is the case with cullet. In this case, it has been found that the entity could operate at temperatures that were appreciably lower than if the same production were carried out in a submerged-electrode furnace. This affords a significant advantage because the refractory linings of the furnaces become worn less quickly in this way and contaminate the glass produced to a lesser extent.

According to yet another alternative form, similar to the third alternative form described above, it is also possible to tip the foamy glass from module B out where module A and the duct conveying the molten glass to the fiber-forming members (or refining compartment) meet, particularly into the region having a throat and a resurgence which allow the glass to be removed from module A.

According to an alternative form, the melting module B opens into the melting module A in the final third of its length, particularly via a gravity overspill system.

It is emphasized that throughout this text, the terms "upstream" and "downstream" refer to the direction of overall flow of the batch materials, from the moment they are introduced into the melting compartments until they arrive, in the molten state, in the fiber-forming members and/or in the refining compartment if there is one.

Another subject of the invention is the process for implementing the melting device described above. As already mentioned, a very advantageous point of the invention is that each of the melting modules A and B can be fed with batch materials that differ in terms of quantity and/or with different chemical compositions and/or different provenance. Thus, the melting module B can be fed with cullet that may be contaminated, that may originate from the flat glass industry or the glass hollow-ware industry for example. It is thus possible to feed with animal meals, sand contaminated with hydrocarbons, foundry sand, organic polymer/glass composites or metal/glass composites, or equally residue from laminated glass or glass fitted with connectors or glass equipped with oxide or metal nitride coatings, or metallic coatings of the silver type (solar glass, low-emission glass, mirrors), glass from the flat glass industry or alternatively greased reinforcing glass yarns, or insulation mineral wool coated with an adhesive/a binder using organic resins. Wet waste from the insulation mineral wool industry, residue from washing slurry, non-fibered material, etc., can be recycled therein. It is also possible to introduce fuels of the liquid or solid hydrocarbon type, such as residue from the oil industry, or organic polymers, heavy oil, coal. All the organic substances also introduced supply at least part of the fuel needed for the submerged burners. Submerged-burner melting thus has the size advantage of being able to "digest" a great many recycled products, a great deal of waste, something which is not so true, in any case is true to a far lesser extent, of conventional melting modules of type A.

The invention thus advantageously allows the recycling of inexpensive materials (or even ones which are free of charge or have a negative cost such as some of the waste items mentioned above), and this allows the overall raw materials cost of the plant to be lowered.

Of course, it is also possible to elect to feed the melting module B with raw materials, particularly ones from quarries, or those supplied by the chemical industry, or to adopt any intermediate solution in which the materials used to feed the module B are partly noble raw materials from quarries, in particular, and partly waste/materials for recycling.

As far as the feed to the melting module A is concerned, precedence is given to conventional raw materials, particularly those from quarry works or the chemical industry. Sand may be used by way of a silica-bearing raw material. By way of a raw material bearing alkaline-earth metal oxides, use may be made of limestone or dolomite. Borax may be used by way of a raw material bearing boron oxide and sodium carbonate may be used by way of a raw material bearing $Na_2O$. By way of an alumina-bearing raw material, use may be made of feldspar. Cullet may be added to this, preferably in modest proportions.

The process for implementing the device according to the invention may consist in operating the melting modules A and B (or B') together or alternately. As seen above, it is thus possible constantly to regulate the regimes of operation of the two modules, on the basis of the desired overall output or of the amount or type of batch material or type of cullet that one wishes to use in the modules A and B, or alternatively on the basis of the desired final type of glass.

Another subject of the invention is the use of this device or of its implementation process for feeding fiber-forming members with molten batch materials. These may be members that form fibers by internal spinning or by external spinning or by mechanical and/or pneumatic drawing.

Figure 2:
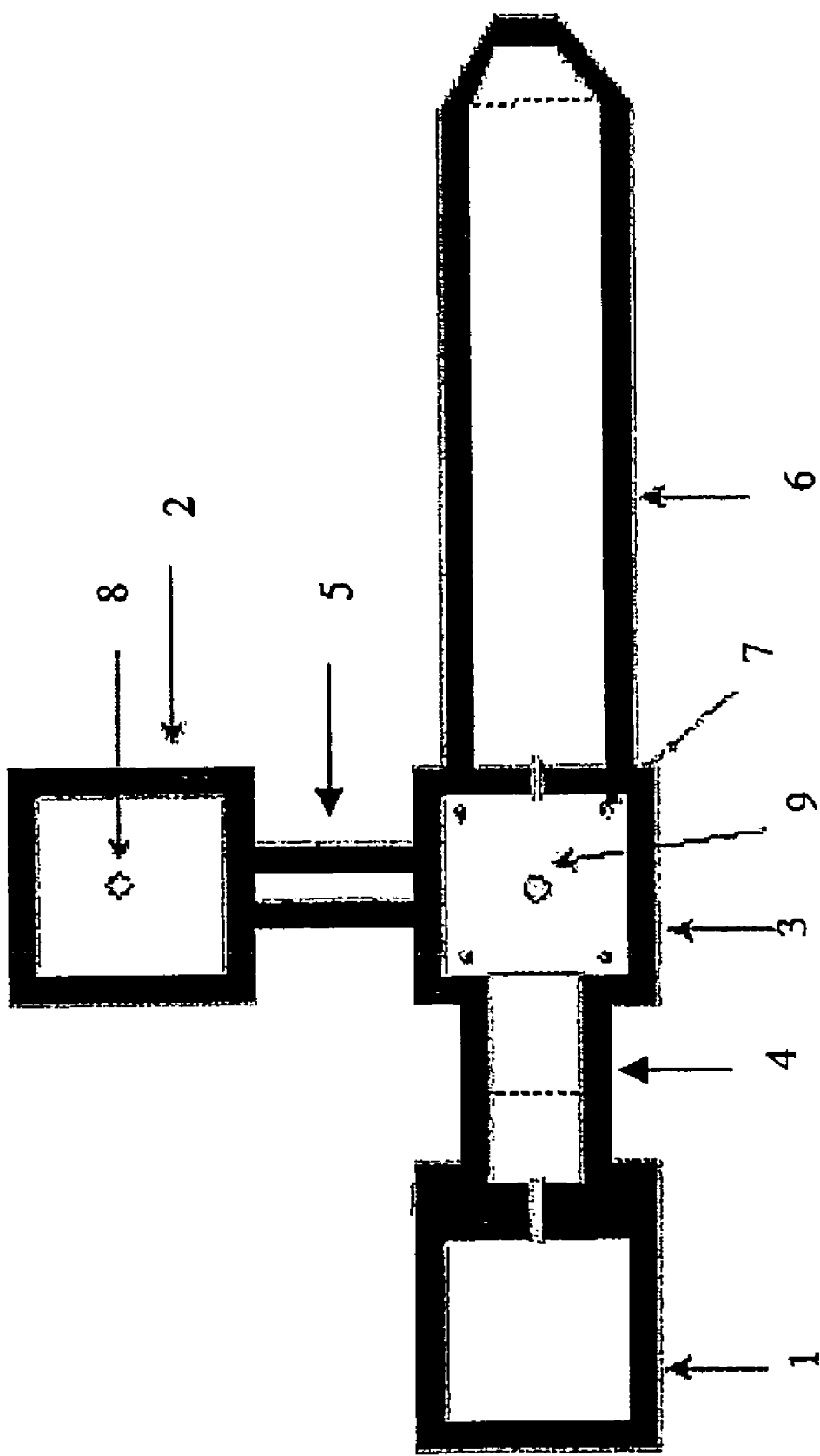
Figure 3:
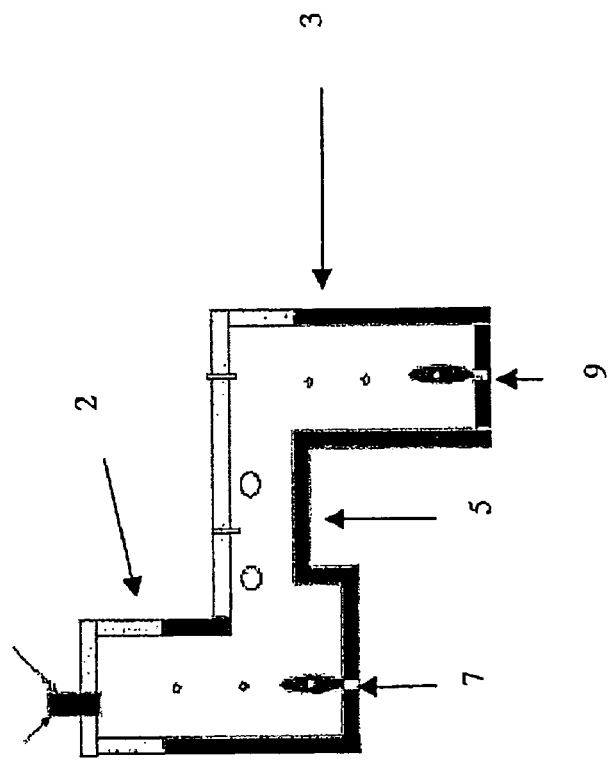
Figure 4:
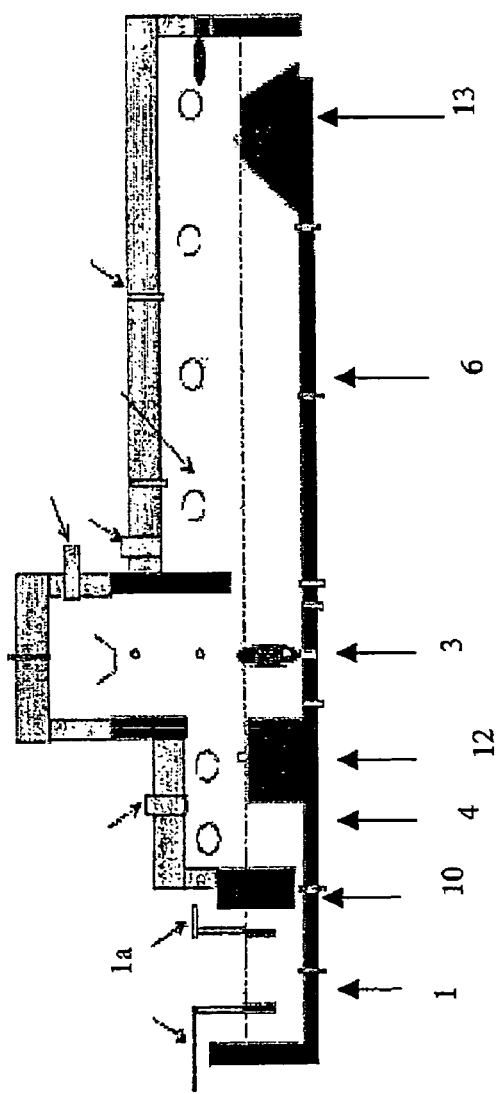

The invention will be described in further detail using a nonlimiting exemplary embodiment and the following figures:

FIG. 1 is a very schematic depiction of a melting plant according to the invention, FIGS. 2, 3 and 4 are more specific depictions of the plant in section and viewed from above.

A preferred embodiment according to the invention consists in adopting the plant the principle of which is illustrated very schematically in FIG. 1, namely: there is a conventional melting module 1, which is an electric furnace of the cold crown variety, using submerged electrodes 1a. In this type of furnace, there is a bath of molten batch materials surmounted by a crust of not yet molten batch materials. The batch materials are introduced into the furnace in a known way by a conveyor belt or endless screw system. There is also a melting module 2 distinct from the module 1 and equipped with at least one submerged burner 8. The modules 1 and 2 open into the transfer ducts 4, 5 themselves opening into a common mixing module 3. The arrows in the figure indicate the direction in which the glass flows throughout the plant. For space occupation reasons in particular, but also to encourage interpenetration and mixing of the streams of glass from the modules 1 and 2, the inlets of said streams via the ducts 4, 5 into the mixing module 3 are more or less perpendicular to one another.

Alternatively, it is possible to contrive for the two streams of glass arriving from the modules 1 and 2 to meet "head-on", along the same axis but in opposite directions. In this case, it is possible for the modules 1, 3 and 2 to be arranged more or less in linear succession, the glass then being removed from module 3 along an axis that is, for example, perpendicular to the previous one. It is also possible to anticipate arranging the modules 1 and 2 approximately side by side, the two streams of glass then arriving in the mixing module 3 in parallel or with convergence.

The module 3 is equipped with at least one submerged burner 9, and with bubblers 7. The important point, in this region, is to achieve the mixing of these two glasses which have different densities, viscosities, and possibly different chemical compositions and different temperatures. To make this homogenization easier, the ducts 4, 5 are equipped with thermal conditioning means, typically a combination of crown burners and air inlets that can be opened/blocked. Once mixing is over, a single stream of glass leaves the module 3 to flow down the duct 6 (where a certain amount of refining may take place if the glass still contains bubbles, particularly ones with a large-diameter, from the "foamy" glass originating from module 2). The duct then feeds the fiber-forming members, not depicted, in a known way.

FIGS. 2, 3 and 4 provide a few additional details on one possible configuration of the plant according to FIG. 1. They are still schematic, and for greater clarity are not drawn to scale.

FIG. 2 is a view from above: it again shows the electric melting module 1, the submerged-burner module 2, the mixing module 3 and the ducts 4, 5 and 6.

FIG. 3, in section, shows the way in which the glass from module 2 is poured out into the mixing module 3: there is a throat system, with the floor of the module 2 raised with respect to that of the module 3. The glass then flows by overspilling into the module 3 via the duct 5 which is fairly narrow. There is therefore in fact a relatively narrow thread of glass which drops into the module 3, via a lip that has not been depicted.

FIG. 4, also in section, shows the configuration of the modules 1, 3 and of the duct 6. Here, the floors of the modules 1 and 3 are (approximately) at the same level. Between the module 1 and the duct 4 there is once again a throat 10, which delimits a far smaller cross section for the flow of the glass. Between the duct 4 and the module 3, the glass flows over a sill 12. In this example, the height of the bath of glass in the duct 6 is determined by another sill 13 downstream of said duct 6.

It is also possible to dispense with this sill, particularly by providing regulation of the level of the glass.

The glass is then removed downstream of the duct "from the top" by passing over said sill 12. An alternative consists in drawing the molten glass off from the bottom at the end of the duct.

In conclusion, resorting, in one and the same plant, to two melting modules using different technologies allows the greatest benefit to be derived from their advantages: on the one hand, use is made of the reliability of a proven industrial solution (electric melting, fuel-fired furnace), and of the quality of the glass obtained therewith, and, on the other hand, the high efficiency, the great flexibility of use, and the less stringent requirement in terms of the materials that can be melted of a submerged-burner melting mode is also enjoyed. Their complementing natures are played off against each other.

By way of example, a table 1 is given below collating the following data:

A: the composition fed to the electric melting module 1 expressed as mass percentages of alumina, silica, alkali metals, alkaline-earth metals, boron in their oxidized form.

B: the mass percentage of the proportion of cullet with respect to composition A, with which the submerged-burner melting module 2 is fed.

Examples 1 to 4 therefore correspond respectively to the case where there is 0, 40, 60 and 80% cullet in the overall composition of the glass obtained. Example 1 with 0% cullet corresponds to the scenario in which the submerged-burner module 2 is not fed: only module 1 is operating, and the composition obtained therefore originates 100% from raw materials fed to the conventional module 1. It is thus possible to elect to have, at the outlet of the duct 6, a glass of roughly constant composition, the chosen ratio of cullet B suitably adjusting/supplementing the composition A.

The composition B of the cullet fed to the module 2 is, for all the examples, of roughly constant composition, which composition is as follows, in mass %:

| | |
|---|---|
| $SiO_2$ | 71.5 |
| $Al_2O_3$ | 0.7 |
| $Fe_2O_3$ | 0.15 |

(sum of the iron oxides expressed in this form)

| | |
|---|---|
| CaO | 9.4 |
| MgO | 3.8 |
| $Na_2O$ | 13.5 |
| $K_2O$ | 0.3 |

(the balance to 100% consisting of impurities of the $SO_3$ type).

This cullet may also originate from glass with coatings, of the thin metallic coating type, of the low-emission or sun-control glass type, or thicker metallic coatings in the case of mirrors. Its composition is then altered accordingly.

TABLE 1

| | Ex 1 | Ex 2 | Ex 3 | Ex 4 |
|---|---|---|---|---|
| A ANALYSIS OF COMPOSITION A FED TO THE CONVENTIONAL MODULE 1 | | | | |
| % $SiO_2$ | 64.5 | 61.0 | 55.6 | 38 |
| % $Al_2O_3$ | 2.5 | 3.7 | 5.4 | 9.5 |
| % $Na_2O + K_2O$ | 17.2 | 18.2 | 21.5 | 29 |
| % CaO | 7.3 | 6.2 | 4.5 | |
| % MgO | 3.0 | 2.5 | 1.8 | |
| % $B_2O_3$ | 4.5 | 7.6 | 11.2 | 23 |
| B % FLOAT GLASS CULLET FED TO THE SUBMERGED-BURNER MODULE 2 | 0 | 40 | 60 | 80 |

This table shows the great flexibility offered by the invention: depending on the requirements and the supplies of cullet, the operation of the submerged-burner module 2 can be shut down completely or, on the other hand, can be made to supply 80% of the molten glass of the entire plant. The amount and type of bearing materials fed to the conventional module 1 are thus adjusted in parallel.

Note that the cullet used in these examples to feed the submerged-burner module 2 comes from the flat glass industry, and in this case is soda-lime-silica base glass. Of course, it is possible to have a very different cullet, to add bearing materials, carbon-containing fuels, as seen above.

Another example illustrating the invention is given below. Module A is a submerged-electrode furnace fed with conventional batch raw materials particularly of the oxides, carbonates, etc. type. The entire production of this module A is tipped directly into a submerged-burner furnace acting as module B, and also incidentally supplied with cullet. The cullet fed to module B represents 85% of the final stream of glass. The final glass has the same composition as the final glass in example 1. It is found that such a configuration works correctly and without producing unmolten inclusions, the electric furnace being raised to 1100° C. and the submerged-burner furnace being raised to 1150° C. The chromium (III) oxide content in the final glass is 0.03 mass %, which indicates low refractory wear. The total energy consumption was 1200 kWh per tonne of glass. By way of comparison, the same production with the same raw materials in a single electrode furnace requires a temperature of 1300° C., a power consumption of 1250 kWh/t and leads to 0.1 mass % of chromium oxide in the final glass.

The present application is the U.S. counterpart of WO 03/045859, the text of which is incorporated by reference, and claims priority to French application No. 01/15354, filed on Nov. 27, 2001, the text of which is incorporated by reference.

The invention claimed is:

1. A device for preparing glass fibers from a final flow of molten glass derived from melting batch material(s) that combines at least two separate melting modules that can both contribute to produce said molten batch materials together or alternately, comprising:
    a module A(1) which is predominantly fitted with heating means in the form of crown burners and/or submerged electrodes and can be fed with batch materials;
    a module B(2) which is predominantly fitted with heating means in the form of (a) submerged burner(s) and can be fed with batch materials;
    wherein the melting module A(1) and the melting module B(2) both open directly or via transfer ducts into a mixing module C(3) which is fitted with at least one stirring and/or heating means, and
    wherein the mixing module C(3) opens directly into a duct feeding fiber-forming members.

2. The device as claimed in claim 1, wherein the melting module B(2) is, in terms of volume and/or in terms of floor area, at least one and a half, twice, or three times smaller than the melting module A(1), or vice versa.

3. The device as claimed in claim 1, wherein the melting module B(2) is fitted with means for recuperating the flue gases, directing them, after possible treatment, toward the melting module A(1) for thermal draining.

4. The device as claimed in claim 1, wherein module A(1) and module (B2) are equipped with a transfer duct or ducts that are fitted with thermal conditioning means.

5. The device as claimed in claim 1, wherein the mixing module C(3) is fitted with at least one stirring and/or heating means selected from the group consisting of bubblers and submerged burners.

6. The device as claimed in claim 1 wherein the mixing module C(3) opens directly or via at least one compartment into a duct (6) feeding fiber-forming members or a refining compartment.

7. The device as claimed in claim 1, wherein the batch materials in the process of being melted into the molten state are allowed to flow from modules A(1) and B(2) toward the mixing module C(3) via gravity overspill by raising at least one of the modules A, B with respect to module C(3), and/or via a throat.

8. The device as claimed in claim 1, wherein there is a transfer duct between one or both of the modules A(1), B(2) and the module C(3), wherein said duct is equipped at the inlet and at the outlet with a throat and/or weir system.

9. The device as claimed in claim 1, wherein the melting module B(2) opens, directly or via at least one duct, in the melting module A.

10. The device as claimed in claim 9, wherein the melting module B(2) opens into the melting module A in the final third of its length.

11. The device as claimed in claim 1, wherein the module A(1) opens into a duct feeding fiber-forming members or a refining compartment and in that module B(2) opens into said duct or said compartment.

12. The device as claimed in claim 11, wherein the region of the duct or of the compartment into which the module B(2) opens is equipped with stirring means and/or with thermal conditioning means.

13. The device as claimed in claim 1, wherein module A(1) is fed with batch raw materials and connected directly or via a duct to module B(2) also supplied with batch raw materials.

14. The device as claimed in claim 1, wherein module A(1) is fitted predominantly with heating means in the form of submerged electrodes.

15. A process for preparing a final flow of molten glass derived from melting batch materials employing the device as claimed in claim 1, wherein melting modules A(1) and B(2) operate together or alternately.

16. The process as claimed in claim 15, wherein the melting module A(1) and the melting module B(2) both open directly or via transfer ducts into a mixing module C(3) and module A(1) produces a first flow of glass, module B(2) produces a second flow of foaming glass, and these two flows are mixed in the mixing module C(3) to form the final flow of molten glass.

17. The process as claimed in claim 15, wherein the melting module B(2) opens, directly or via at least one duct, into the melting module A(1), wherein module B(2) produces a foaming glass that spills over a weir-like system into the melting glass of module A(1).

18. The process as claimed in claim 15, wherein the module A(1) opens into a duct feeding fiber-forming members or a refining compartment and in that module B(2) opens into said duct or said compartment, wherein module B(2) produces a flow of foaming glass that meets the flow of glass coming from module A(1) in the duct into which module A(1) opens.

19. The process as claimed in claim 15, wherein the melting modules A(1) and B(2) are fed with batch materials that differ in terms of quantity and/or in terms of chemical composition.

20. The process as claimed in claim 15, wherein the melting module B(2) is fed with cullet that may be contaminated, polymer/glass composites, metal/glass composites, residue from the insulation mineral wool industry, reinforcing glass yarns, contaminated sand, and/or foundry sand; and
   optionally with liquid and/or solid hydrocarbon-containing fuels, such as fuel oil, coal, organic polymers, or animal meals.

21. The process as claimed in claim 15, wherein melting module A(1) is fed with at least one of the following materials: silica-bearing raw material of the sand type, alkaline-earth metal oxide raw material such as limestone or dolomite, boron-oxide-bearing raw material such as borax, sodium oxide raw material such as sodium carbonate, alumina raw material such as feldspar, or cullet.

22. The process as claimed in claim 15, wherein the production of molten batch materials of each of the melting modules A(1) and B(2) is regulated jointly, according to the desired overall output of the melting device and/or according to the recycling materials available.

23. The process as claimed in claim 15, wherein module B(2) is fed with cullet.

24. The process as claimed in claim 15, wherein module A(1) is fitted predominantly with heating means in the form of submerged electrodes.

25. A method, which comprises:
   feeding molten batch materials to fiber-forming members employing the device as claimed in claim 1.

26. A method, which comprises:
   feeding molten batch materials to fiber-forming members employing the device as claimed in claim 1; wherein modules A(1) and B(2) operate together or alternately.

27. The device as claimed in claim 1, wherein the mixing module C(3) is fitted with at least one stirring and/or heating means selected from the group consisting of bubblers and submerged burners, and wherein there is no refining compartment between module B(2) and the mixing module C(3), and there is no refining compartment between the mixing module C(3) and the fiber-forming members.

* * * * *